(12) United States Patent
Montenegro et al.

(10) Patent No.: US 9,854,099 B1
(45) Date of Patent: *Dec. 26, 2017

(54) CALL CENTER CALL-BACK PUSH NOTIFICATIONS

(71) Applicant: Wells Fargo Bank, N.A., San Francisco, CA (US)

(72) Inventors: Dennis Emmanuel Montenegro, Concord, CA (US); Prasanth Nandanuru, Hyderabad (IN); Pavan Kumar Arln, Hyderabad (IN); Yejjala Yevanna, U. Kothapalli Mandal (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,825

(22) Filed: Nov. 3, 2016

Related U.S. Application Data (63) Continuation of application No. 15/014,702, filed on Feb. 3, 2016, now Pat. No. 9,516,126, which is a continuation of application No. 14/461,856, filed on Aug. 18, 2014, now Pat. No. 9,288,324.

(51) Int. Cl.
| | |
|---|---|
| *H04M 3/00* | (2006.01) |
| *H04M 5/00* | (2006.01) |
| *H04M 3/42* | (2006.01) |
| *H04M 3/523* | (2006.01) |
| *H04M 3/51* | (2006.01) |

(52) U.S. Cl.
CPC ......... *H04M 3/523* (2013.01); *H04M 3/5183* (2013.01)

(58) Field of Classification Search
CPC ............. H04M 3/5183; H04M 3/5232; H04M 3/42059; H04M 3/5166; H04M 3/42034
USPC ............ 379/265.11, 265.09, 265.05, 266.06, 379/207.15, 207.13, 201.01, 265.01, 242
See application file for complete search history.

(56) References Cited

U.S. PATENT DOCUMENTS

| | | | |
|---|---|---|---|
| 5,825,869 | A | 10/1998 | Brooks et al. |
| 6,714,643 | B1 | 3/2004 | Gargeya et al. |
| 7,415,417 | B2 | 8/2008 | Boyer et al. |
| 7,668,171 | B2 | 2/2010 | Bondarenko et al. |
| 8,112,069 | B2 | 2/2012 | Williams et al. |
| 8,457,300 | B2 | 6/2013 | Hemm et al. |
| 8,565,411 | B2 | 10/2013 | Kannan et al. |
| 9,319,439 | B2 * | 4/2016 | Zhang ................ H04L 65/1069 |

(Continued)

OTHER PUBLICATIONS

CDW, "Contact Center Technologies—New features are remaking and improving agent-customer interactions," Feb. 2013, p. 12.

(Continued)

*Primary Examiner* — Thjuan K Addy
(74) *Attorney, Agent, or Firm* — Merchant & Gould P.C.

(57) ABSTRACT

A method for creating a push notification at a call center includes: receiving a call from a caller device; receiving, from the caller device, caller identification information; receiving, from the caller device, an inquiry; generating an encrypted token including the caller identification information and the inquiry; and when an agent is available, sending a push notification to the caller device for connecting the caller to the agent, the push notification being associated with the encrypted token, and wherein the agent uses the caller identification information from the encrypted token when the agent is addressing the inquiry.

20 Claims, 6 Drawing Sheets

(56) References Cited

U.S. PATENT DOCUMENTS

| | | |
|---|---|---|
| 2003/0009530 A1 | 1/2003 | Philonenko et al. |
| 2011/0286586 A1 | 11/2011 | Saylor et al. |
| 2013/0051546 A1 | 2/2013 | Fried et al. |
| 2013/0195258 A1 | 8/2013 | Atef et al. |
| 2013/0244632 A1 | 9/2013 | Spence et al. |
| 2014/0245143 A1 | 8/2014 | Saint-Marc |
| 2014/0321634 A1 | 10/2014 | Baranovsky et al. |
| 2014/0337424 A1 | 11/2014 | Lee et al. |

OTHER PUBLICATIONS

Fonolo, "Adding Call-Backs to Your Call Center," Sep. 2012, p. 1.
Shore Tel, "Abandoned Calls Hurt," 2011, p. 1.
Suhm et al., "Call Browser: A System to Improve the Caller Experience by Analyzing Live Calls End-to-End," 2009, Abstract.
Telecommunications Weekly (NewsRx), Avaya Inc., "Patent Issued for Instant Message Contact Management in a Contact Center," Jun. 19, 2013, pp. 2-3.

* cited by examiner

CALL CENTER CALL-BACK PUSH NOTIFICATIONS

BACKGROUND

Call centers often suffer from staffing issues and/or periods of high caller volume that result in long queues before a caller speaks to a customer service agent. During these times of high caller volume and/or insufficiently staffed customer service agents, callers may encounter queues of up to an hour or more. Furthermore, callers may be required to provide identification and inquiry information to several customer service agents and/or interactive computing devices before speaking to a customer service agent who is qualified to handle the customer's inquiry. Additionally, if the call is disconnected, the caller is required to contact the call center and once again provide identification and inquiry information. As a result, contacting call centers can be viewed as a time consuming and repetitive process, often discouraging callers from seeking the appropriate assistance they require.

SUMMARY

In general terms, this disclosure is directed to sending push notifications to a customer device when a call center agent is available to assist a customer with an inquiry. In a first aspect, the present disclosure is directed to a method for creating a push notification at a call center using a server computing device, the method comprising: receive a call from a caller device; receive, from the caller device, caller identification information; receive, from the caller device, an inquiry; generate an encrypted token including the caller identification information and the inquiry; and when an agent is available, send a push notification to the caller device for connecting the caller to the agent.

In a second aspect, the present disclosure is directed to a call center, comprising: an interactive voice recognition (IVR) system configured to: receive, from a caller device, caller identification information; receive, from the caller device, an inquiry; send, to the caller device, a wait time and an option for receiving a push notification; and receive, from the caller device, a message to enroll in receiving the push notification. The call center further includes a server computing device configured to: generate an encrypted token including the caller identification information and the inquiry; and when an agent is available, send a push notification to the caller device for connecting the caller to the agent.

DETAILED DESCRIPTION

Various example embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In examples provided herein, a push notification is sent to a caller device indicating that a call center agent is available and including a link in the push notification that directly connects the caller with the available call center agent. Further, in some embodiments, the call center agent with whom the caller is connected is an agent specifically selected to address the caller's inquiry, thereby minimizing additional hold times to connect an agent that is appropriate for handling the caller's inquiry.

Figure 1:
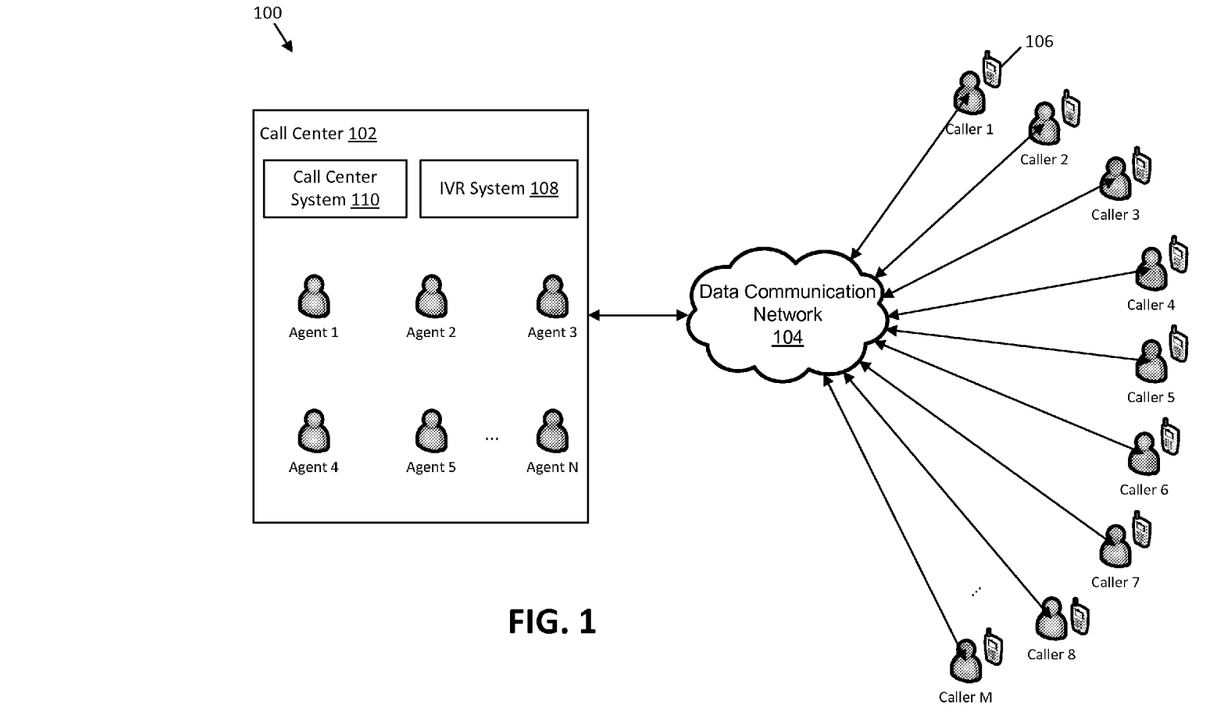
FIG. 1 is a schematic block diagram of an example call center network.

FIG. 1 is a schematic block diagram of an example call center network 100. As shown, the example call center network 100 includes a call center 102 in communication with callers C1-CM (although the specification herein refers to multiple callers, for simplicity, callers are hereinafter referred to as caller(s)) over a data communication network 104. Callers are equipped with caller communication devices 106, such as, for example, cellular phones. In other embodiments, callers may make calls using a landline telephone, or using a computing device.

The call center 102 is an example of an agency or office that accommodates call center agents 1-N (although the specification herein refers to multiple call center agents, for simplicity, call center agents are hereinafter referred to as agent(s)) and is equipped with a telephone network, a telecom switch, telephones, computing devices, etc. that are used to handle large volumes of calls and caller inquiries. In some embodiments, the agents are located in separate regions, but are capable of handling caller inquiries as if the call center 102 was housed in one location. Companies frequently use call centers in order to handle large volumes of caller inquiries ranging from a multitude of topics. For example, a financial institution may employ call center agents to assist customers with questions relating to for example, bank cards, reporting a lost or stolen bank card, bank statements, bank hours, branch locations, account management services, opening new accounts, loan and mortgage information, loan services, insurance, investments, etc.

In embodiments of the present disclosure, the call center 102 further includes an automated interactive voice response (IVR) system 108 that is used to initially interact with callers before connecting the caller with an agent. In an example embodiment, the IVR system 108 is an automated voice controlled system that is used to identify a caller and retrieve caller account information, using, for example, a caller's phone number, home address, bank account number, social security number, invoice number, credit card number, or any combination thereof. The IVR system 108 is also used to obtain caller inquiry information that may be used by the agents and/or to connect a caller with an agent who is qualified to handle the callers inquiry. The IVR system 108 will be discussed in more detail herein. Although an IVR system is discussed, an agent and/or a touchtone system may also be used to retrieve caller information and obtain caller inquiry information.

The call center 102 further includes a call center system 110 that is used to, for example, retrieve and store customer information, determine customer inquiries, identify call center agents, and generate push notifications. In some embodiments, the call center system 110 is a server computing device.

The data communication network 104 permits data, such as voice data and digital data, to be communicated between caller devices 106 and agent devices at the call center system 110. An example of a data communication network 104 is a wireless or cellular communication network that uses a protocol such as 802.11, CDMA, GSM, or FDMA.

Figure 2:
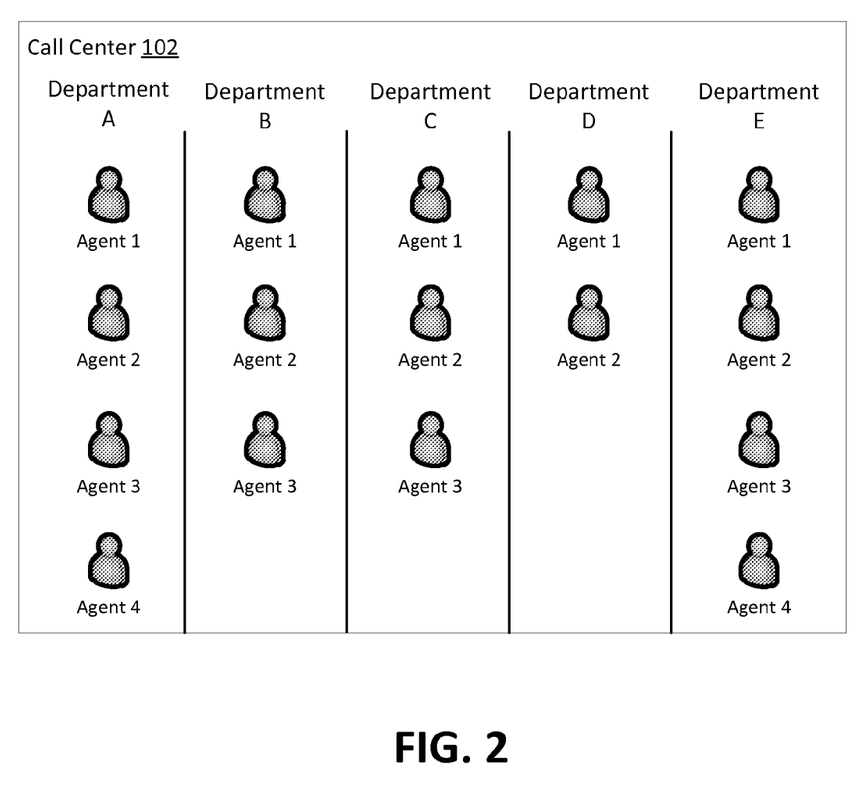
FIG. 2 is a block diagram illustrating the structure of an example call center.

FIG. 2 is a block diagram illustrating the structure of an example call center 102. As discussed above, companies use call centers to assist customers with a variety of inquiries. As shown, the example call center may host a variety of call center agents who are grouped into various departments (departments A-E), wherein each department may handle different call inquiries. For example, agents in Department A may handle customer billing inquiries, agents in Department B may handle loan inquiries, agents in Department C may handle fraud or lost credit card inquiries, agents in Department D may handle account management services inquiries, and agents in Department E may handle all inquiries that do not fit into the categories handled by Departments A-D. As shown, there is a finite number of agents staffed in each department, and as a result, callers may experience long wait times between initiating the call and talking to an agent. Accordingly, embodiments of the present disclosure are directed to reducing the amount of time callers are required to wait to speak to an agent at a call center. In particular, embodiments of the present disclosure describe providing the caller with an option to receive, at the caller device 106, a push notification when an agent becomes available, wherein the push notification includes a link or a phone number that connects the caller directly to the available agent at the call center 102 without requiring the caller to re-provide information or wait on hold.

Figure 3:
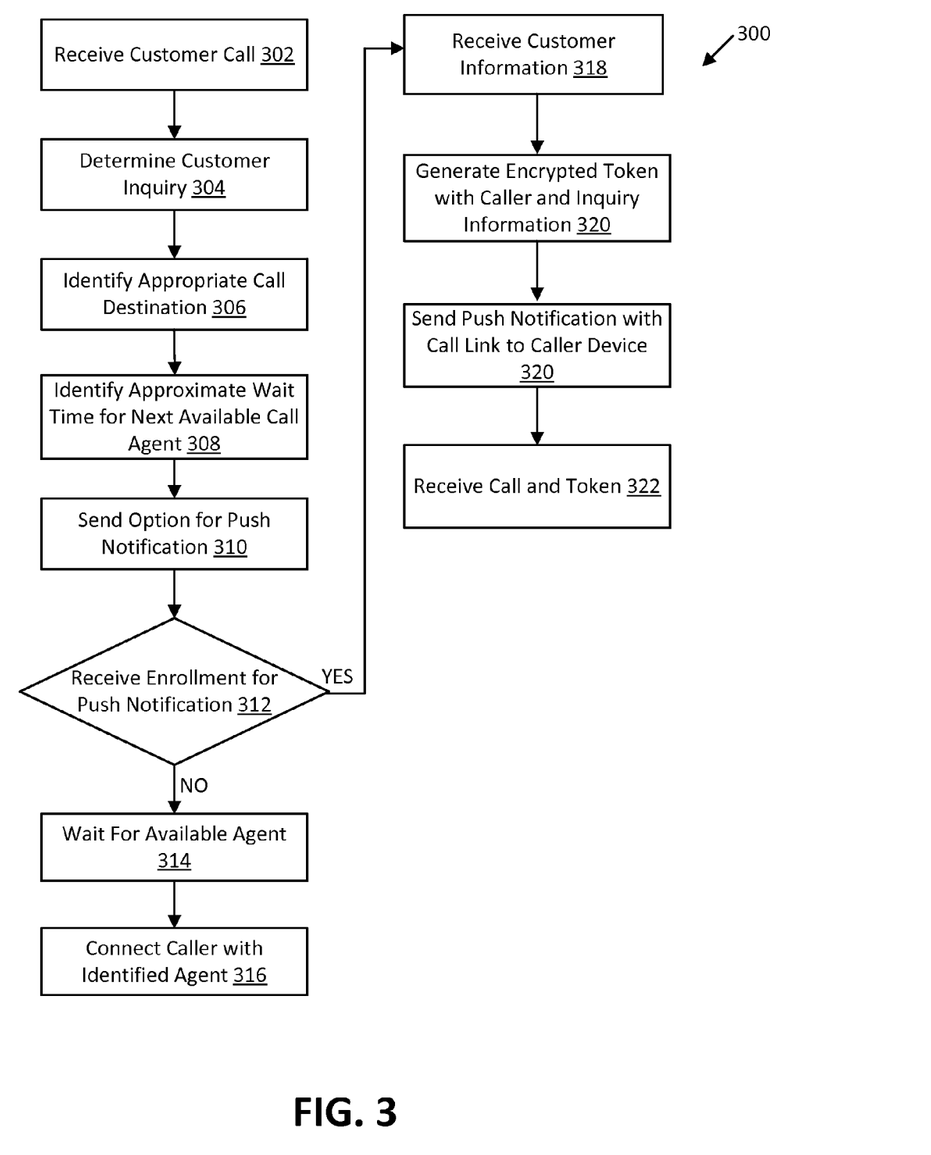
FIG. 3 is a flow chart illustrating an example method used by an IVR system of a call center.

FIG. 3 is a flow chart illustrating an example method 300 used by a call center 102. The method 300 begins at step 302 in which the system of the call center 102 receives a customer call. This may also involve identifying, using the IVR system 108, the customer and the customer's language preference. In a further example, this step involves retrieving the customer's account information, using, for example, the customer's phone number, home address, bank account number, social security number, invoice number, credit card number, or any combination thereof.

At step 304, the call center system 110 determines the customer's inquiry. In some embodiments, this involves using the IVR system 108 to ask the customer to select from a menu of options relating to the general topic of the inquiry and thereafter determining the caller's particular inquiry. As discussed herein, determining the customer's inquiry allows the call center system 110 to identify the appropriate call center agent to handle the customer's inquiry.

Accordingly, in step 306, the call center system 110 identifies the appropriate call destination (e.g., center agent, queue, or department) to handle the call. In some embodiments, identifying the appropriate agent involves first determining the appropriate department for handling the customer's inquiry and thereafter identifying an available agent within the identified department. Step 306 may further involve identifying a call center agent who speaks a language as requested by the customer in step 302.

If no agent is currently available, the method 300 proceeds to step 308 to determine the approximate wait time for the next available agent. In some embodiments, this involves determining the number of callers waiting to speak to an agent in the identified department and calculating an approximate wait time based on the number of callers and complexity of issues, for example. Accordingly, the call center system 110 identifies, to the customer, the approximate wait time for the next available agent.

Flow proceeds to step 310 in which the call center system 110 sends an option for a push notification. In some embodiments, the option for a push notification is sent when call volumes and/or wait times are above threshold volumes or wait times. In some embodiments, this involves sending a message to the customer device 106, using the IVR system 108 and asking whether the customer would like to enroll in the option of receiving a push notification message. In some embodiments, this involves using the IVR system 108 to inform the customer of the option to receive a push notification message on their caller device 106 rather than waiting during the approximate wait period identified in step 308. Generally, a push notification is a message that is sent by a server to a client device, such as a customer's cell phone. A push notification allows the server to transmit messages to the customer device without first receiving, from the customer device, a request for the message or information. Accordingly, a push notification enables the server to initiate message transmission to the customer device.

The method 300 proceeds to decision 312 in which the call center system 110 receives a selection from the customer. In some embodiments, this involves receiving the selection from the customer through the IVR system 108. If the customer decides not to enroll in the push notification option, for example, by either stating, to the IVR system 108 that (s)he would not like to enroll, or by pressing a button associated with the option of not enrolling, then flow proceeds to step 314 in which the customer waits for the next available call center agent. Then in step 316, the customer is connected to the call center agent.

If, however, the customer wishes to enroll in the push notification option, then flow proceeds to step 318. At step 318, the call center system 110 receives customer information, such as, for example, the customer's preferred cellular device number, a time or time period the customer prefers to discuss the inquiry, and/or the language the customer prefers to speak. Additionally, the customer may identify more details relating to his/her specific inquiry. In some embodiments, these details are received through the IVR system 108.

In step 320, the call center system 110 generates an encrypted token associated with the customer's inquiry and customer information identified during the call in order to maintain the customer's context at a later time when the agent speaks to the customer. In some embodiments, the token is an alphanumeric value that is generated at a server and encrypted with a secure hash algorithm, such as SHA-256. The token acts as a unique identifier for identifying the call initiated by the customer from their mobile device. For example, the system may store the information such as customer identification information, the customer's inquiry, customer's identified device phone number, preferred call times, language, etc. Furthermore, the call center system 110 may also identify customer information related to the inquiry that the agent will need in assisting the customer. For example, if the customer's inquiry is related to a mortgage payment, the call center system 110 may populate the customer's previous ten mortgage payments, dates of each payment, and the account number from which each payment originated. Alternatively, if the customer's inquiry is related to a lost or stolen credit card, the call center system 110 may populate recent purchases made on the lost or stolen credit card. Populating such contextual information provides the call center agent with background information relating to the customer's inquiry before or at the time the agent speaks to the customer, thereby saving time associated with re-requesting such contextual information from the customer. Accordingly, once the encrypted token is generated, the token and customer information are stored in a database.

Once a call center agent is available, in step 320, the call center system 110 sends a push notification to the caller device 106. As described herein, a push notification is a message sent by a server to a caller device 106. The push notification may include a clickable link that connects the customer directly to the call center agent. Alternatively, the push notification may include the phone number of an available agent, queue, or department.

In step 322, the call center agent receives the generated token and associated customer contextual information when the customer clicks on the link in the push notification or when the customer directly calls the agent, queue, or department as directed in the push notification. In some embodiments, the call center agent receives the generated token and associated customer information before the agent is connected to the customer. In either scenario, the customer's contextual information is populated on the call center agent's screen so as to provide the customer with immediate customer support.

Figure 4:
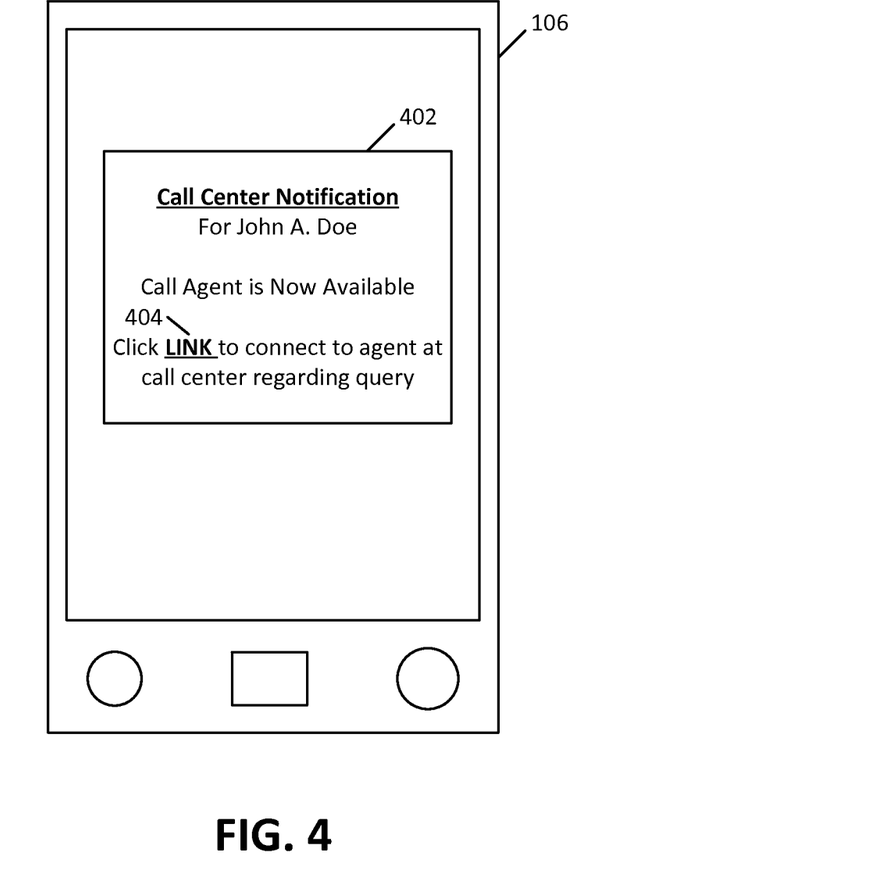
FIG. 4 is an example push notification on a caller device.

FIG. 4 is an example push notification 402 on a caller device 106. As described herein, a push notification is a message that is sent by a central server to a caller device 106, such as a cell phone. A push notification allows a central server, such as the call center system 110, to transmit messages to the caller device 106 without first receiving, from the caller device 106, a request for the message or information. A push notification may be a window or a banner element that is briefly displayed over operating applications and/or a lock screen of the user device. Alternatively, the push notification can appear as an icon on the customer's device 106 that the customer can open to access. The push notification is used to display information to a user and may be selectably expanded by the user to display links or additional information. In an example embodiment, the customer has installed on their device 106 an application that allows for the receipt of push notifications 402 from a central server, such as the call center system 110. An example of a push notification is a toast notification.

Yet in other embodiments, rather than receiving a push notification 402, the customer may instead receive a text message or an e-mail indicating the availability of a call center agent and a link directing the customer directly to the identified agent. Accordingly, a push notification enables the central server to initiate message transmission to the caller device 106.

As illustrated, the example push notification 402 contains information for customer, John Doe, indicating that an agent is now available. The example push notification 402 includes a link 404 that directly connects customer, John Doe to the agent at the call center 102. In alternative embodiments, the push notification 402 may include further information such as the agent's direct phone number, a time frame indicating how long the agent is available, and/or details regarding the customer's inquiry. In some embodiments, if the customer does not click the link 404 during a stated time period or during a time period that the particular agent is available, the link 404 expires and the customer can no longer contact the available call center agent.

Figure 5:
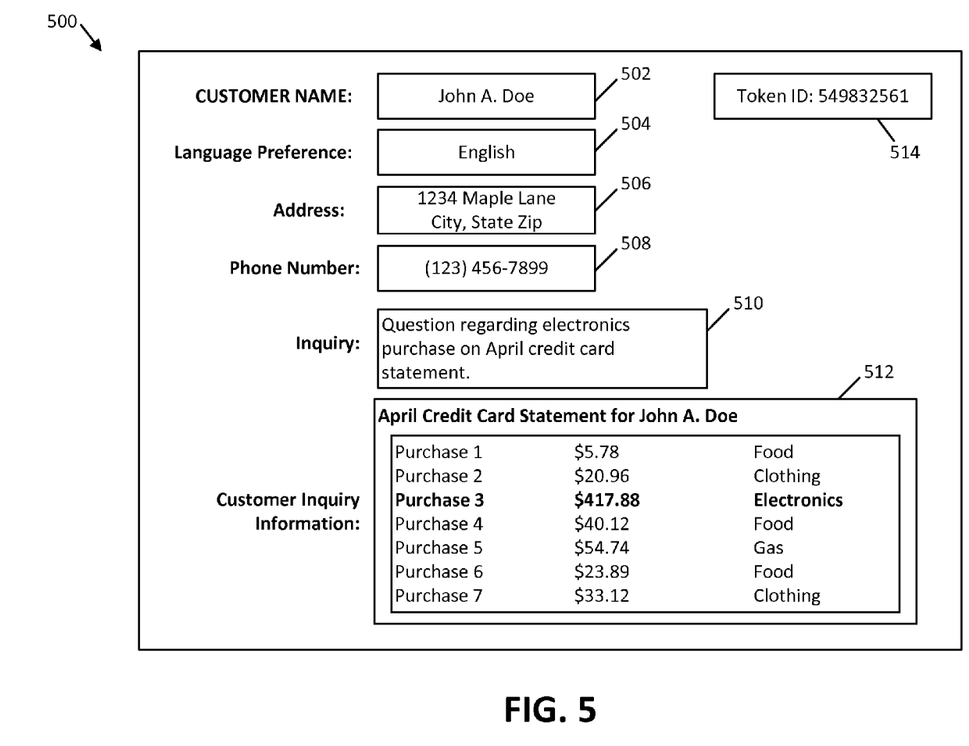
FIG. 5 is an example of a screen populated for a call center agent.

FIG. 5 is an example of a screen 500 populated for a call center agent using the token as described herein. The screen 500 includes contextual information relating to the customer and the customer's specific inquiry so as to immediately assist the customer without having to ask the customer to re-provide identification and/or inquiry information. In this example, the screen 500 includes the customer's name 502, the customer's language preference 504, the customer's address 506, and the customer's phone number 508. The screen 500 also includes information relating to the customer's inquiry 510. As shown in this example, the customer's inquiry relates to a question regarding a purchase on the customer's April credit card statement. Accordingly, the screen 500 also includes additional information 512 relating to the customer's inquiry about a purchase made in April. For example, the additional information 512 includes the customer's April credit card statement including details regarding the purchase in question. Also shown in this example is the token identification number 514 associated with the particular customer inquiry 510.

Figure 6:
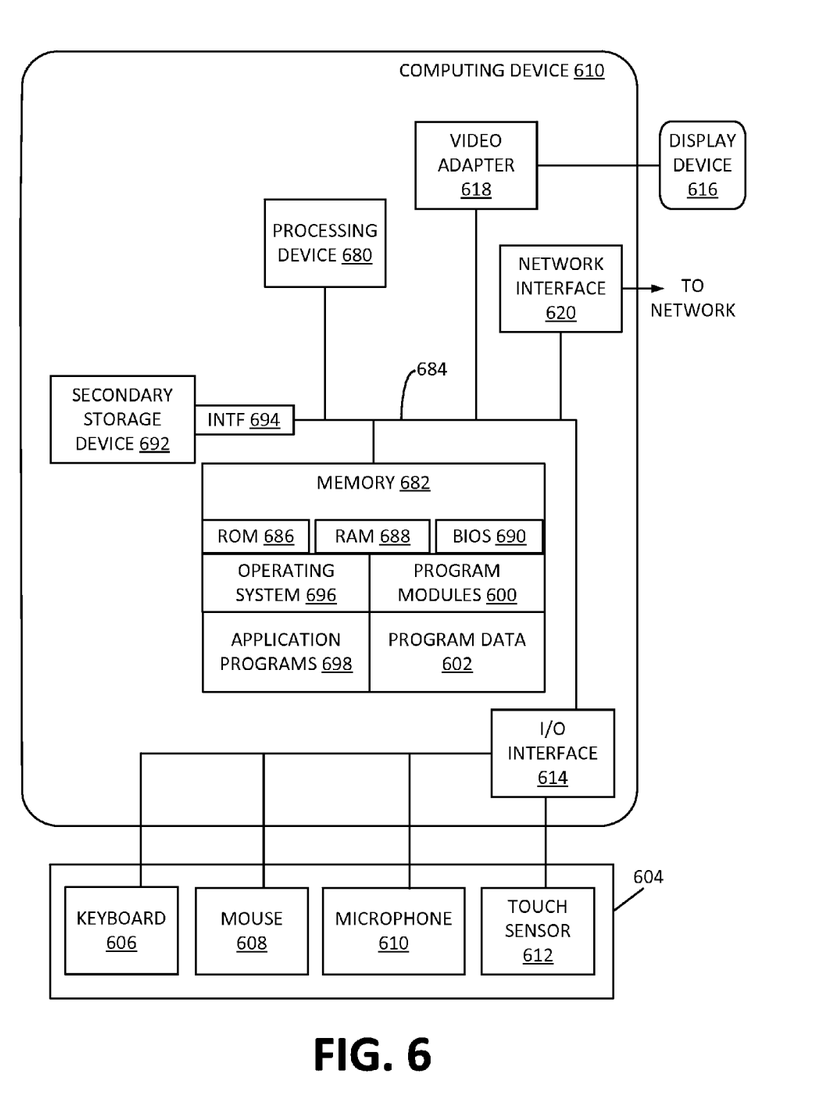
FIG. 6 illustrates an exemplary architecture of a computing device that can be used to implement aspects of the present disclosure.

FIG. 6 illustrates an exemplary architecture of a computing device that can be used to implement aspects of the present disclosure, including any of the plurality of call center agent computing devices, the call center system 110, caller device 106, or IVR system 108. The computing device illustrated in FIG. 6 can be used to execute the operating system and application programs as described herein. By way of example, the computing device will be described below as the computing device 610. To avoid undue repetition, this description of the computing device will not be separately repeated herein for each of the other computing devices, including, for example, the call center agent computing device, the call center system 110, the caller device 106, the IVR system 108, or servers, but such devices can also be configured as illustrated and described with reference to FIG. 6.

The computing device 610 includes, in some embodiments, at least one processing device 680, such as a central processing unit (CPU). A variety of processing devices are available from a variety of manufacturers, for example, Intel or Advanced Micro Devices. In this example, the computing device 610 also includes a system memory 682, and a system bus 684 that couples various system components including the system memory 682 to the processing device 680. The system bus 684 is one of any number of types of bus structures including a memory bus, or memory controller; a peripheral bus; and a local bus using any of a variety of bus architectures.

Examples of computing devices suitable for the computing device 610 include a desktop computer, a laptop computer, a tablet computer, a mobile computing device (such as a smart phone, an iPod® or iPad® mobile digital device, or other mobile devices), or other devices configured to process digital instructions.

The system memory 682 includes read only memory 686 and random access memory 688. A basic input/output system 690 containing the basic routines that act to transfer information within computing device 610, such as during start up, is typically stored in the read only memory 686.

The computing device 610 also includes a secondary storage device 692 in some embodiments, such as a hard disk drive, for storing digital data. The secondary storage device 692 is connected to the system bus 684 by a secondary storage interface 694. The secondary storage devices 692 and their associated computer readable media provide nonvolatile storage of computer readable instructions (including application programs and program modules), data structures, and other data for the computing device 610.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 692 or memory 682, including an operating system 696, one or more application programs 698, other program modules, and program data 602. The computing device 610 can utilize any suitable operating system, such as Microsoft Windows™, Google Chrome™, Apple OS, and any other operating system suitable for a computing device.

In some embodiments, a user provides inputs to the computing device 610 through one or more input devices 204. Examples of input devices 604 include a keyboard 606, mouse 608, microphone 610, and touch sensor 612 (such as a touchpad or touch sensitive display). Other embodiments include other input devices 604. The input devices are often connected to the processing device 680 through an input/output interface 614 that is coupled to the system bus 684. These input devices 604 can be connected by any number of input/output interfaces, such as a parallel port, serial port, game port, or a universal serial bus. Wireless communication between input devices and the interface 614 is possible as well, and includes infrared, BLUETOOTH® wireless technology, 802.11a/b/g/n, cellular, or other radio frequency communication systems in some possible embodiments.

In this example embodiment, a display device 616, such as a monitor, liquid crystal display device, projector, or touch sensitive display device, is also connected to the system bus 684 via an interface, such as a video adapter 618. In addition to the display device 616, the computing device 610 can include various other peripheral devices (not shown), such as speakers or a printer.

When used in a local area networking environment or a wide area networking environment (such as the Internet), the computing device 610 is typically connected to the network 612 through a network interface 220, such as an Ethernet interface. Other possible embodiments use other communication devices. For example, some embodiments of the computing device 610 include a modem for communicating across the network.

The computing device 610 typically includes at least some form of computer readable media. Computer readable media includes any available media that can be accessed by the computing device 610. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 610. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 6 is also an example of programmable electronics, which may include one or more such computing devices, and when multiple computing devices are included, such computing devices can be coupled together with a suitable data communication network so as to collectively perform the various functions, methods, or operations disclosed herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method for providing customer service to a caller, the method comprising:
   initiating, at a caller device, a first voice call for customer service;
   providing an option to receive a notification to connect the caller device to one of a plurality of customer service agents at a later point in time;
   sending, by the caller device, a response accepting the option to receive the notification;
   disconnecting the caller device from the first voice call;
   receiving, at the later point in time, the notification to connect the caller device to one of the plurality of customer service agents; and
   initiating, in response to receiving the notification at the caller device, a second voice call to one of the plurality of customer service agents.

2. The method of claim 1, wherein the notification comprises a push notification.

3. The method of claim 2, wherein the push notification comprises one of a window element, a banner element or an icon.

4. The method of claim 2, wherein the push notification identifies a telephone number of an available customer service agent.

5. The method of claim 1, wherein the notification comprises an e-mail or a text message.

6. The method of claim 5, wherein the notification includes a link that, when selected, causes the caller device to connect to an available customer service agent.

7. The method of claim 1, wherein the notification includes a link that, when selected, causes the caller device to connect to one of the plurality of customer service agents.

8. The method of claim 7, wherein the notification identifies a time period that one of the plurality of customer service agents is available.

9. The method of claim 8, wherein the link expires when the second voice call is not initiated from the caller device to one of the plurality of customer service agents within the time period.

10. The method of claim 1, further comprising sending the response to accept the option to a call center.

11. A method for providing customer service to a caller, the method comprising:
- initiating, at a caller device, a first voice call for customer service;
- providing an option to receive a push notification to connect the caller device to one of a plurality of customer service agents at a later point in time;
- sending, by the caller device, a response accepting the option to receive the push notification;
- receiving, at the later point in time, the push notification to connect the caller device to one of the plurality of customer service agents; and
- initiating, in response to receiving the push notification at the caller device, a communication to one of the plurality of customer service agents.

12. The method of claim 11, further comprising disconnecting the caller device from the first voice call.

13. The method of claim 11, wherein initiating the communication comprises initiating a second voice call to one of the plurality of customer service agents.

14. The method of claim 11, wherein the push notification identifies a telephone number of an available customer service agent.

15. The method of claim 11, wherein the push notification includes a link that, when selected, causes the caller device to connect to one of the plurality of customer service agents.

16. The method of claim 11, wherein the push notification identifies a time period that one of the plurality of customer service agents is available.

17. The method of claim 16, wherein the link expires when the communication from the caller device to one of the plurality of customer service agents is not initiated within the time period.

18. The method of claim 11, wherein the push notification comprises one of a window element, a banner element or an icon.

19. The method of claim 11, further comprising sending the response to accept the option to a call center.

20. An electronic computing device comprising:
- a processing unit; and
- system memory, the system memory including instructions which, when executed by the processing unit, cause the electronic computing device to:
  - initiate, at a caller device, a first voice call for customer service;
  - provide an option to receive a push notification to connect the caller device to an available customer service agent at a later point in time;
  - send, by the caller device, a response accepting the option to receive the push notification;
  - disconnect the caller device from the first voice call;
  - receive, at the later point in time, the push notification to connect the caller device to the available customer service agent, the push notification including a telephone number of the available customer service agent; and
- initiate, in response to receiving the push notification at the caller device, a second voice call to the available customer service agent.

* * * * *